United States Patent [19]

Jang

[11] Patent Number: 5,857,814
[45] Date of Patent: Jan. 12, 1999

[54] APPARATUS FOR CONTROLLING TAPPING-DRILLING MACHINE

[76] Inventor: Kwan Soon Jang, 146 Sam-dong (5th Woosung Apt., Bldg. 7, #305), Euiwang-shi Kyeonggi do, South Korea, Rep. of Korea

[21] Appl. No.: 738,028

[22] Filed: Oct. 24, 1996

[30] Foreign Application Priority Data

Oct. 31, 1995 [KR] Rep. of Korea .................. 1995-38278

[51] Int. Cl.$^6$ ........................... B23B 47/16; B23B 47/24; B23B 49/00
[52] U.S. Cl. ..................................... 408/6; 408/9; 408/11; 408/14; 408/17; 408/128; 408/135; 474/70; 474/273
[58] Field of Search ............................... 408/6, 9–11, 14, 408/17, 128, 135, 137; 474/11, 12, 17, 69, 70, 273

[56] References Cited

U.S. PATENT DOCUMENTS

| | | | |
|---|---|---|---|
| 4,342,528 | 8/1982 | Nozu et al. | 408/9 |
| 4,443,137 | 4/1984 | Albrent | 408/9 |
| 4,704,689 | 11/1987 | Asakura | 364/474 |
| 4,831,364 | 5/1989 | Shinohara et al. | 340/680 |
| 4,854,786 | 8/1989 | Alexander et al. | 408/1 R |
| 5,149,232 | 9/1992 | Eckman | 408/137 |
| 5,328,303 | 7/1994 | Jang | 408/14 |

FOREIGN PATENT DOCUMENTS

| | | |
|---|---|---|
| 57-144607 | 2/1981 | Japan . |
| 58-15608 | 7/1981 | Japan . |
| 60-52210 | 9/1983 | Japan . |
| 61-7846 | 3/1985 | Japan . |

*Primary Examiner*—Steven C. Bishop
*Attorney, Agent, or Firm*—Baker & Daniels

[57] ABSTRACT

An apparatus for controlling a tapping-drilling machine is disclosed in which holes can be formed by means of drilling tools, and threads can be formed by means of tapping tools. A worm is elongately formed on a spindle, and a worm wheel which is meshed with the worm is secured by a lateral shaft. At the leading end of the lateral shaft, there is installed a brake. In the preferred embodiment of the present invention, the electronic type brake is employed, and the electric current flowing through this brake is adjusted, so that the velocity of the vertical movement of the spindle sleeve (which is defined to be the ratio of the vertical moving distance to the revolutions of the spindle) can be automatically adjusted. For this purpose, an overall supervising controller in the form of a micro-controller is provided to receive sensed data from a spindle revolution sensing section, a revolution deviation (difference) sensing section, a spindle sleeve position sensing section and a manipulation switching section so as to output computed control data to an electronic brake control section, a motor forward/reverse driving section and an operation and alarming display section. Thus during a tapping or drilling operation, the microcontroller controls the pre-requisite functions for the automation of the tapping or drilling operation such as a step feeding function, a chip breaking function, a dual feeding function, a dwelling function, an overload protecting function, and the motor forward/reverse driving function.

6 Claims, 8 Drawing Sheets

5,857,814

APPARATUS FOR CONTROLLING TAPPING-DRILLING MACHINE

FIELD OF THE INVENTION

The present invention relates to an apparatus for controlling a tapping-drilling machine in which holes can be formed by means of drilling tools, and threads can be formed by means of tapping tools. Particularly, the present invention relates to an improvement of U.S. Pat. No. 5,328,303 (granted to the present applicant and entitled "Automatic Spindle Moving Device for Tapping-Drilling Machine") in which a spindle with a drilling chuck or a tapping chuck attached is made to perform vertical movements in an automatic manner. The present invention improves this prior art by employing a micro-controller.

DESCRIPTION OF THE PRIOR ART

The conventional automatic spindle moving method for the automatic drilling machine is classified into two types. In the first type, the moving of the spindle is realized by using a separate pulley or a motor as the power source, and by combining gears to this. The second type uses a pneumatic or hydraulic pump as the power source, and here, there are involved a pneumatic or hydraulic cylinder, direction control valves, and hydraulic fluid level adjusting valves. In these types, the mechanism for the automatic spindle moving becomes complicated and grows into a large bulk. Particularly, if the major functions such as step feeding, chip breaking, dual feeding and other protecting features are to be provided, the mechanism becomes very complicated.

Meanwhile, the automatic tapping machine is of a gear type, involving a worm, a worm wheel, and a plurality of gears. Further, when replacing a tapping tool, the gear set has to be wholly replaced, and a single machine cannot simultaneously serve as both an automatic drilling machine and as an automatic tapping machine.

SUMMARY OF THE INVENTION

The present invention is intended to overcome the above described disadvantages of the conventional techniques.

Therefore, it is an object of the present invention to provide an apparatus for controlling a tapping-drilling machine, in which, without a separate pneumatic or hydraulic device or other power source, the drilling speed and the tapping pitch can be controlled, and one single machine can serve as both a drilling machine and as a tapping machine.

In achieving the above object, the apparatus for controlling a tapping-drilling machine according to the present invention includes: a sensor for sensing the revolution status of the spindle; another sensor for sensing the vertical moving distance of the spindle; an electronic brake for allowing the vertical movement of the spindle; and a micro-controller for continuously controlling the lead (which is the ratio of the advancement of a spindle sleeve to the revolutions of the spindle).

Further, in the present invention, a combi-tap can be used, so that a drilling and a tapping can be carried out simultaneously with a single process.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

The apparatus of the present invention can be described based on 9 sections.

First, the present invention will be described on the basic mechanical constitution A.

Figure 1:
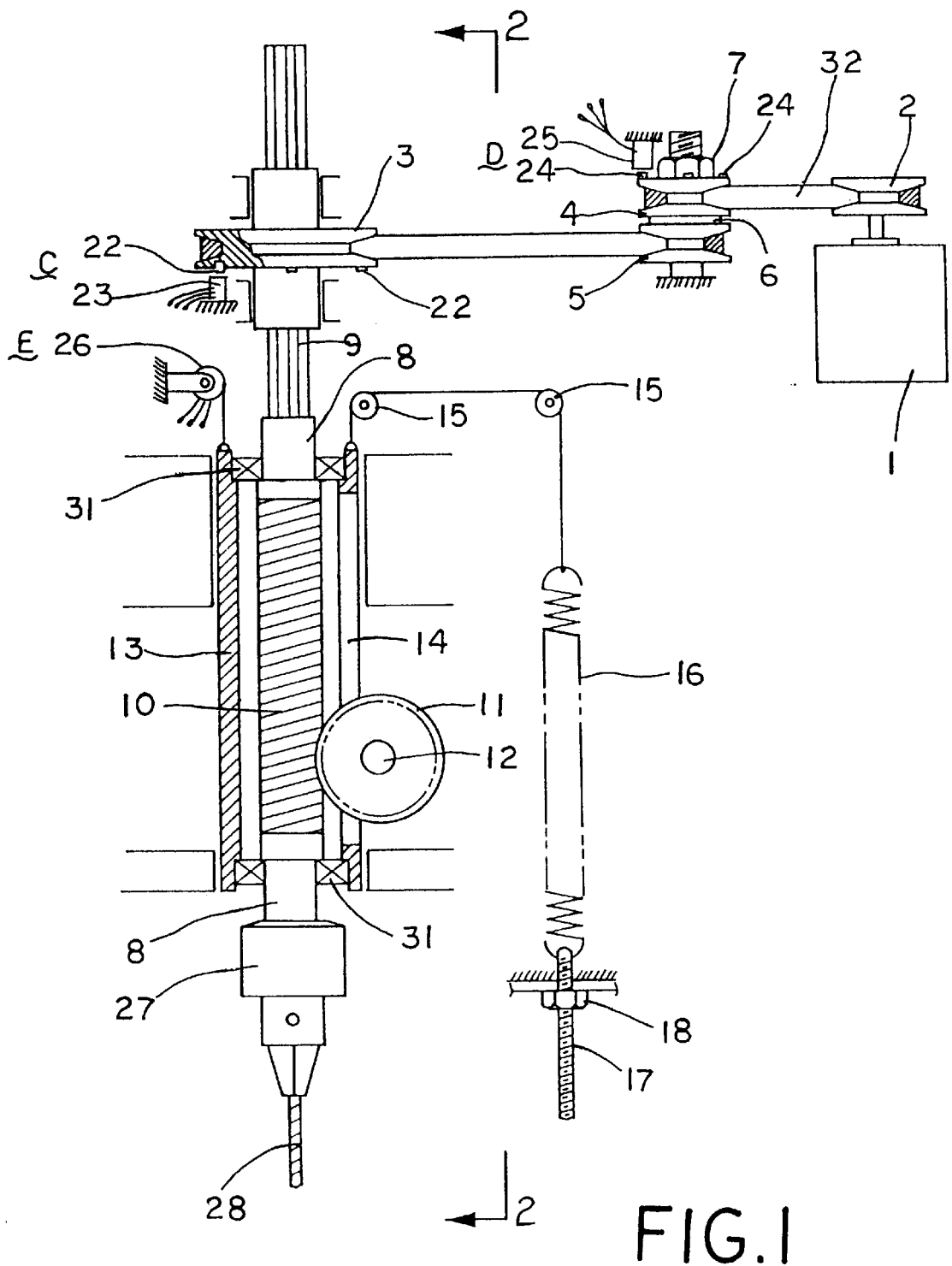
FIG. 1 is a schematic illustration of the mechanism according to the present invention.
Figure 2:
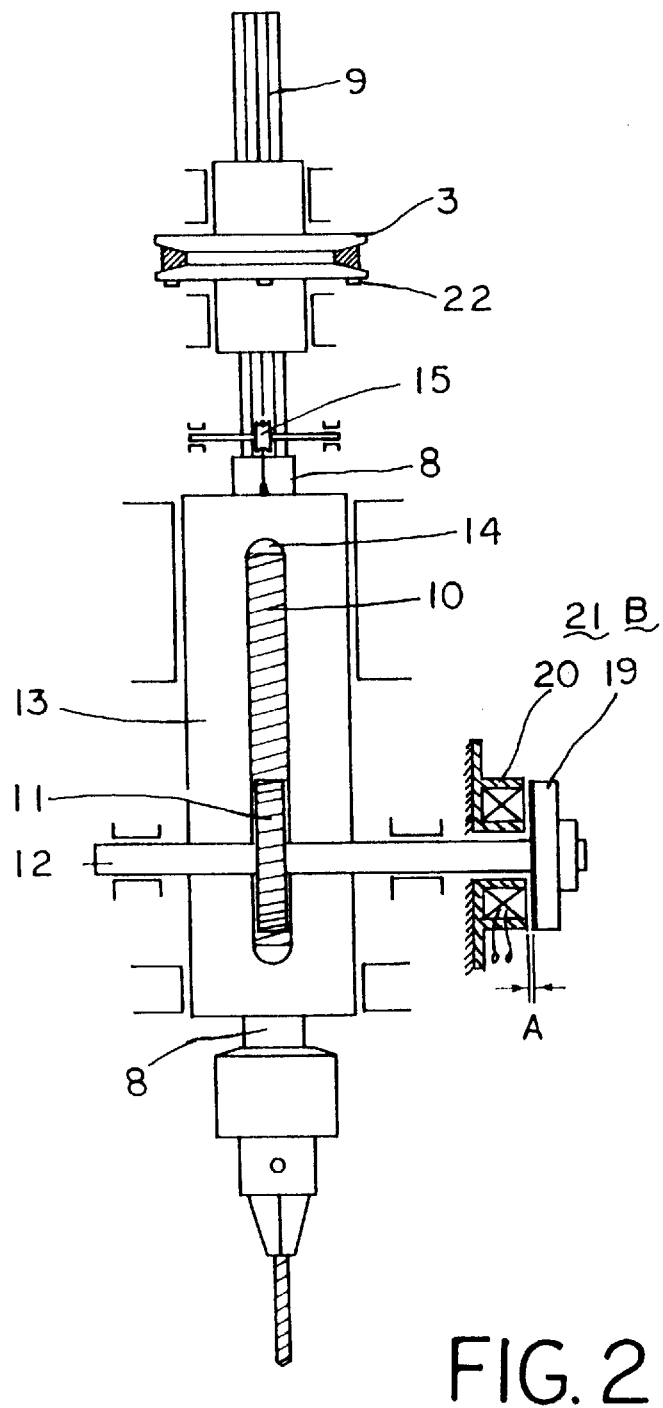
FIG. 2 is a sectional view taken along a line 2—2 of FIG. 1.

As shown in FIGS. 1 and 2, the power is transmitted from a motor 1 through a driving pulley 2 and driving and passive intermediate pulleys 4 and 5 to a passive pulley 3. A spindle 8 revolves and moves up and down along a spline shaft which slides up and down through the hollow hole of the passive pulley 3. The spindle 8 is rotatably supported within a spindle sleeve 13, and the middle portion of the spindle 8 forms a worm 10. A worm wheel 11 is meshed with the worm 10, and on a side of the spindle sleeve 13, there is formed an elongate vertical slot 14. The worm wheel 11 is supported by a lateral shaft 12, and an electronic brake 21 is installed on one end of the lateral shaft 12.

Three to five annular grooves are provided on each of the driving pulley 2, the passive pulley 3, and the passive intermediate pulley 5, but the drawing shows that only a single annular groove is provided on each of them for the sake of simplification.

The driving intermediate pulley 4 and the passive intermediate pulley 5 are known ones, and a lining 6 is attached between the driving intermediate pulley 4 and the passive intermediate pulley 5 so as to provide a power transmitting torque. In this case, the torque is adjusted by means of an internal spring (not shown) and a nut 7.

That is, if a load higher than the adjusted torque is imposed, the pulleys are slipped.

Further, for return of the spindle sleeve 13, a roller 15 and a tension coil spring 16 are installed usually within a piped supporting pole. The lower end of the tension coil spring 16 is fastened with a bolt 17 and a nut 18, so that the force of the tension coil spring 16 can be adjusted.

Reference code 27 is a drill chuck, 28 is a drill, 29 is a tap, 30 is an object to be machined, 31 is a bearing, and 32 is a belt.

Second, descriptions will be made on an electronic brake control section B according to the present invention.

As described in the basic mechanical constitution and as shown in FIG. 2, the electronic brake 21 includes an armature 19 and a stator 20. The armature 19 is secured to an end of the lateral shaft 12, and the stator 20 is installed across an air gap a, the stator 20 being fixed on the body of the tapping-drilling machine.

Third, descriptions will be made on a spindle revolution sensing section C according to the present invention.

This section C senses the revolution state of the spindle 8 such as existence or absence of the revolution of the spindle 8 and the revolution speed of the spindle 8. The passive pulley 3 is made of a non-magnetic material such as aluminum (Al), and on one face of the passive pulley 3, there are installed a plurality of permanent magnets, (in the number of 4 in the embodiment of the present invention). Further, a hall effect switch 23 faces with one of the permanent magnets 22, thereby sensing the revolution state of the spindle 8.

Fourth, descriptions will be made on a revolution difference sensing section D according to the present invention.

Similarly to the spindle revolution sensing section C, on the upper face of the driving intermediate pulley 4, there are buried a plurality of permanent magnets 24. Further, a hall effect switch 25 is made to face one of the permanent magnets 24, thereby sensing the revolutions state of the pulley. If the load of the spindle 8 exceeds the adjusted torque (adjusted by the nut 7), then slipping occurs between the driving intermediate pulley 4 and the passive intermediate pulley 5, with the result that a difference occurs in the revolutions of the two pulleys (ultimately in the passive pulley 3). Thus an excessive load is detected.

Fifth, descriptions will be made on a spindle sleeve position sensing section E according to the present invention.

A selection is made from among a linear potentiometer, a linear encoder, a rotary potentiometer, and a rotary encoder, so that the selected one would perform linear movements or rotary movements together with the vertical movements of the spindle sleeve 13 (a rotary potentiometer 26 is selected in the present invention). Thus the position of the spindle sleeve 13 is sensed. As an example, an encoder is made to emit pulses proportionally to the position of the spindle sleeve 13. As another example, a potentiometer 26 is made to generate a voltage proportionally to the position of the spindle sleeve 13.

Sixth, descriptions will be made on the constitution of the manipulation switching section F according to the present invention.

The switching section F includes various switches for controlling: a program for various parameters required for carrying out the drilling and tapping; input signals needed for operation initiation; emergency stop signals; and alarm terminating signals.

Seventh, descriptions will be made on a motor forward/reverse revolution control section G according to the present invention.

This section G is constituted such that, during a drilling or a tapping, the motor is controlled so as to be driven forward or reverse in accordance with control signals of a micro-controller I.

Eighth, descriptions will be made on an operating and alarming display section H according to the present invention.

This section H is constituted as follows. That is, during the inputting of programs for various parameters required for drilling and tapping, the procedure for the programs and inputting switches are displayed, and status of the devices in relation to the operation is displayed. Further, there is provided a warning means for providing a warning upon encountering an abnormal status.

Ninth, descriptions will be made on the micro-controller according to the present invention.

This micro-controller I is an overall controlling device having computation and control functions and a function of controlling the memory and input/output. Further it controls various input and output sections in accordance with its internal program.

For the above described sections, their functions will be described below.

First, the functions of the basic mechanical constitution A will be described.

As shown in FIGS. 1 and 2, the motor 1 revolves to transmit the power through the driving pulley 2, the driving intermediate pulley 4 and the passive intermediate pulley 5 to the passive pulley 3. Then the power is transmitted through the spline shaft 9, the worm 10 (machined in the rightward thread form) of the spindle 8, the worm wheel 11, and the lateral shaft 12 to the armature 19 of the electronic brake 21. Therefore, the spindle 8 and the worm wheel 11 revolves at a constant speed ratio. That is, as shown in FIG. 3, the spindle 8 and the worm wheel 11 revolve in the directions of the arrow marks.

Figure 4:
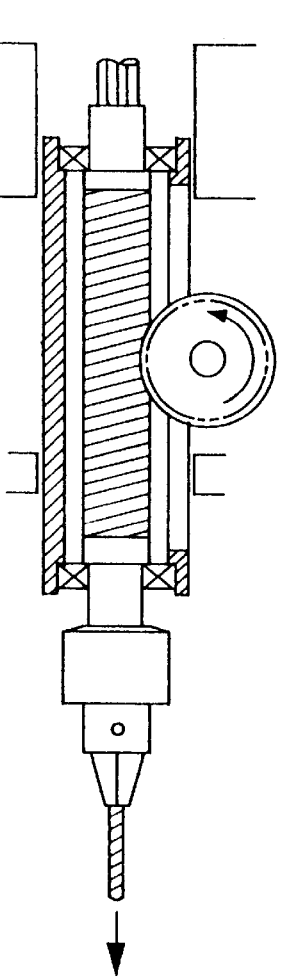
FIG. 4 illustrates a case in which the spindle is stopped, and only the worm wheel is rotated.
Figure 5:
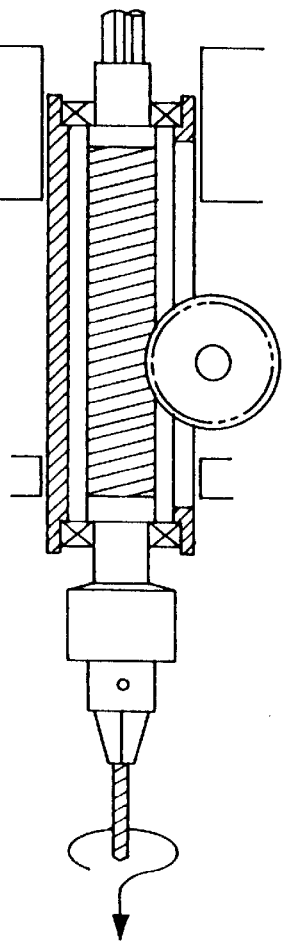
FIG. 5 illustrates a case in which the worm wheel is stopped, and the spindle is rotated.
Figure 6:
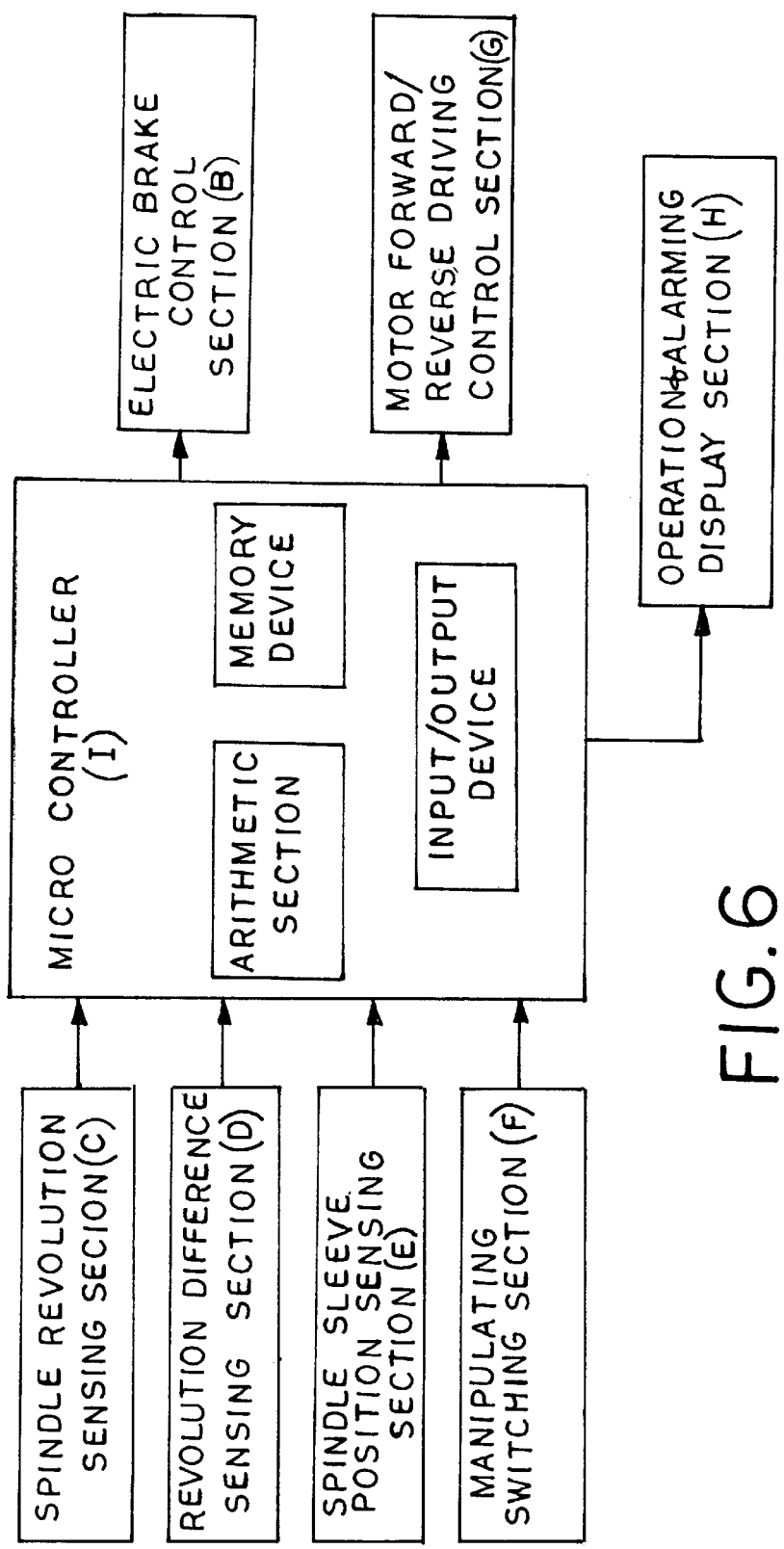
FIG. 6 is a block diagram showing the constitution of the electronic system according to the present invention.

In FIG. 4, the spindle 8 is stopped, and the worm wheel 11 revolves anti-clockwise. That is, the spindle 8 does not revolve but descends. In FIG. 5, the worm wheel 11 is stopped, and only the spindle 8 revolves. That is, the spindle 8 revolves, and at the same time, it descends as much as its own pitch.

Second, the functions of the electronic brake control section B will be described.

Figure 3:
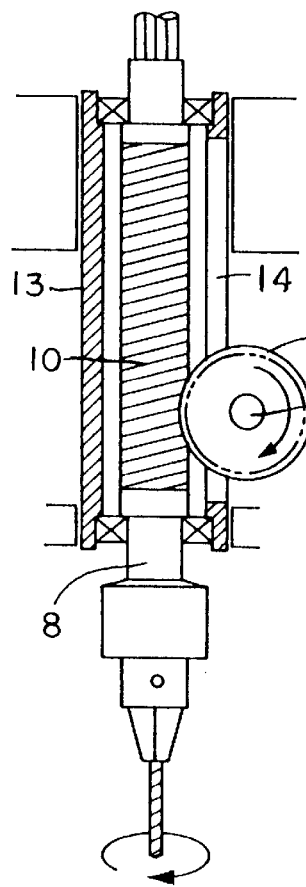
FIG. 3 illustrates the normal operation of the apparatus according to the present invention.

As described in connection with the basic mechanical constitution, FIG. 3 illustrates a state in which a current is not supplied to the electronic brake 21. In this state, the spindle 8 does not descend but only revolves. However, if a current is slowly supplied to the electronic brake 21, then the spindle 8 revolves and at the same time slowly descends.

For example, it is assumed that the reduction ratio between the worm 10 of the spindle 8 and the worm wheel 11 is 30, and that the pitch of the worm 10 is 5 mm. If the spindle 8 revolves 30 revolutions, then the worm wheel 11 must revolve one revolution, because the worm wheel 11 has 30 teeth (the case of FIG. 3). However, if a current is slowly increasingly supplied to the electronic brake 21 so as for it to revolve only $29/30$ revolutions, then the power equivalent to one revolution of the spindle 8 which corresponds to $1/30$ revolutions of the worm wheel 11 is converted to a force which makes the spindle 8 descend as much as 5 mm which is the pitch of the worm 10.

Further, if the current is slightly further increased so as for the worm wheel 11 to revolve $28/30$ revolutions, that is, if the teeth of the worm wheel 11 are made to pass by as many as 28 per 30 revolutions of the spindle 8, then the spindle sleeve 13 descends as much as 10 mm which is equivalent to 2 revolutions of the spindle 8, and which corresponds to $2/30$ revolutions of the worm wheel.

Third, the functions of the spindle revolution sensing section C will be described.

If a plurality of the permanent magnets 22 are disposed equidistantly on one side face of the passive pulley 3, the magnet portions and the portions other than the magnet portions show different magnetic flux density. If a device for sensing the intensity of the flux density, e.g., the hall effect switch 23 is used, the state of the spindle revolution such as the spindle revolution speed can be sensed. This sensed result is sent to the micro-controller I.

Fourth, the functions of the revolution difference sensing section D will be described.

The typical cases in which an overload is imposed on the spindle 8 are as follows. That is, they are: the case where the drill 28 or the tap 29 is worn out, or where chips are built up; the case where the hole to be drilled or tapped is too deep; and the case where the tool penetrates a blow hole when drilling a cast object. If one of such excessive loads is imposed, the speed ratio of the spindle 8 to the driving intermediate pulley 4 is destroyed to generate an abnormal difference. This abnormal difference is sensed by the revolution difference sensing section D so as to send the sensed result to the micro-controller I. Then the micro-controller I stops the motor 1, and generates an alarm.

Fifth, the functions of the spindle sleeve position sensing section E will be described.

The vertical position of the spindle sleeve 13 is converted into a linear or circular position. That is, in the case where a linear potentiometer or a linear encoder is employed, the conversion is made into a linear position. On the other hand, in the case where a rotary potentiometer 26 or a rotary encoder is employed, the conversion is made into a circular position.

In the case where an encoder is used, the sensing can be made in the form of pulses. In the case where the potentiometer is used, the position information is obtained in the form of voltages which is formed by resistance dividing of the supply voltage.

Sixth, the functions of the manipulating switch section F will be described.

This section includes various switches needed for operations. That is, there are: a switch for the program of various parameters needed in carrying out drilling and tapping; a switch for input signals for operation; a switch for terminating an alarm; and a switch for an emergency stop. The operating switch section F supplies logic values (0 or 1) for the operation.

Seventh, the functions of the motor forward/reverse revolution control section G will be described.

During the drilling or tapping, the motor 1 is driven forwardly or reversely according to needs. The motor revolution control section G amplifies the forward or reverse control signals of the micro-controller I so as to drive relays (mechanical or electronic), and so as to ultimately control the forward or reverse revolutions of the motor 1.

Eighth, the functions of the operation and alarm display section H will be described.

During the inputting of the program of various parameters needed for drilling and tapping, the operation and alarm display section H displays the procedure for the program and the inputting switch. Further it displays the status of various devices, and generates alarms, while this section H consists of rows and columns.

Ninth, the functions of the micro-controller I will be described.

This has overall functions of controlling the computations and the memory input/output. That is, this micro-controller I receives signals from the spindle revolution sensing section C, the revolution difference sensing section D, the spindle sleeve position sensing section E and the manipulating switch section F, so as to carry out the required control functions. Then the micro-controller I outputs signals to the electronic brake control section B, to the motor forward/reverse revolution control section G and to the operation and alarm display section H.

Now the apparatus of the present invention having the constitutions and functions as described above will be described as to its operation and effects.

The machine of the present invention is capable of carrying out drilling and tapping, and first the drilling operation will be described.

<Drilling>

When drilling a thick object 30 by means of a drill 28, if the drilling is continued without stop, the drilled hole can be clogged with chips, and the drilling resistance is greatly increased. Consequently, the drill 28 may be broken or heated to be worn out early. In order to prevent this phenomenon, there is a step feed function in which the drilling is carried out discontinuously by dividing the drilling operation into several steps. Further, if the chip is extended elongately, then an impediment is imposed on the drilling operation, and therefore, there is a chip breaking function in which the elongate chip is broken into short lengths. When the drill passes through a sharp portion of the object to be drilled, an excessive force is imposed on a point on the drill, and therefore, the drill is apt to be broken. In order to prevent such a disaster, there is a dual feed function in which the drilling speed is reduced. After reaching the target depth, the drill is made to revolve idly without advancement so as to improve the roughness and the precision of the drilled hole, and this is the dwelling function. As described in connection with the revolution difference sensing section D, a moment at which an excessive load is imposed on the drill is sensed to protect the drill (overload protecting function). The above described functions are the prerequisite to the drilling machine automation. In the present invention, the micro-controller I performs the above described 5 functions, by increasing, decreasing or suppressing the electric current of the electronic brake 21, so as to drive the motor forward/reverse or to a stand still. Thus the functions of the apparatus of the present invention are diversified. The basic operation of a drilling and the above mentioned 5 functions will be described in detail below.

<Basic Operation of the Drilling>

The parameters needed for a drilling (such as the diameter of the drill, the material of the object to be drilled, the drilling advancement speed, the original point of the spindle sleeve, the drilling starting position, and the drilling end position) are set through the manipulation switch section F and the operation and alarm display section H.

After the inputting of the machining parameters, if a machining initiation signal is inputted, an initial electronic brake current is supplied suitably in accordance with the diameter of the drill and the material of the object to be drilled. At the same time, the motor 1 is made to revolve forward to make the spindle sleeve 13 descend. Then the revolution state of the spindle 8 and the current position of the spindle sleeve 13 are inputted through the spindle revolution sensing section C and the spindle sleeve position sensing section E. When the current position reaches a drilling starting position L1, a current value required for the drilling operation is supplied to the electronic brake 21. At the same time, the revolution state of the spindle 8 and the current positions of the spindle sleeve 13 are continuously inputted so as to obtain the current drilling advancement speed. Under this condition, if the current drilling speed is faster than the set value, the electric current is properly reduced, while if the current drilling speed is slower than the set value, the electric current is properly increased. Thus, the set drilling speed is reached.

In this manner, the drilling is continued. Then when a drilling end position L2 is reached, the electronic brake current is made to be zero. Then the spindle sleeve 13 returns to the original position Lo owing to the restoring force of the tension coil spring 16. Or the electronic brake current is maintained as it is, and only the motor 1 is driven reverse, so that the spindle sleeve 13 would return to the original position Lo owing to its own force and the restoring force of the spring 16. Under this condition, the electronic brake current may be reduced to zero.

Figure 7:
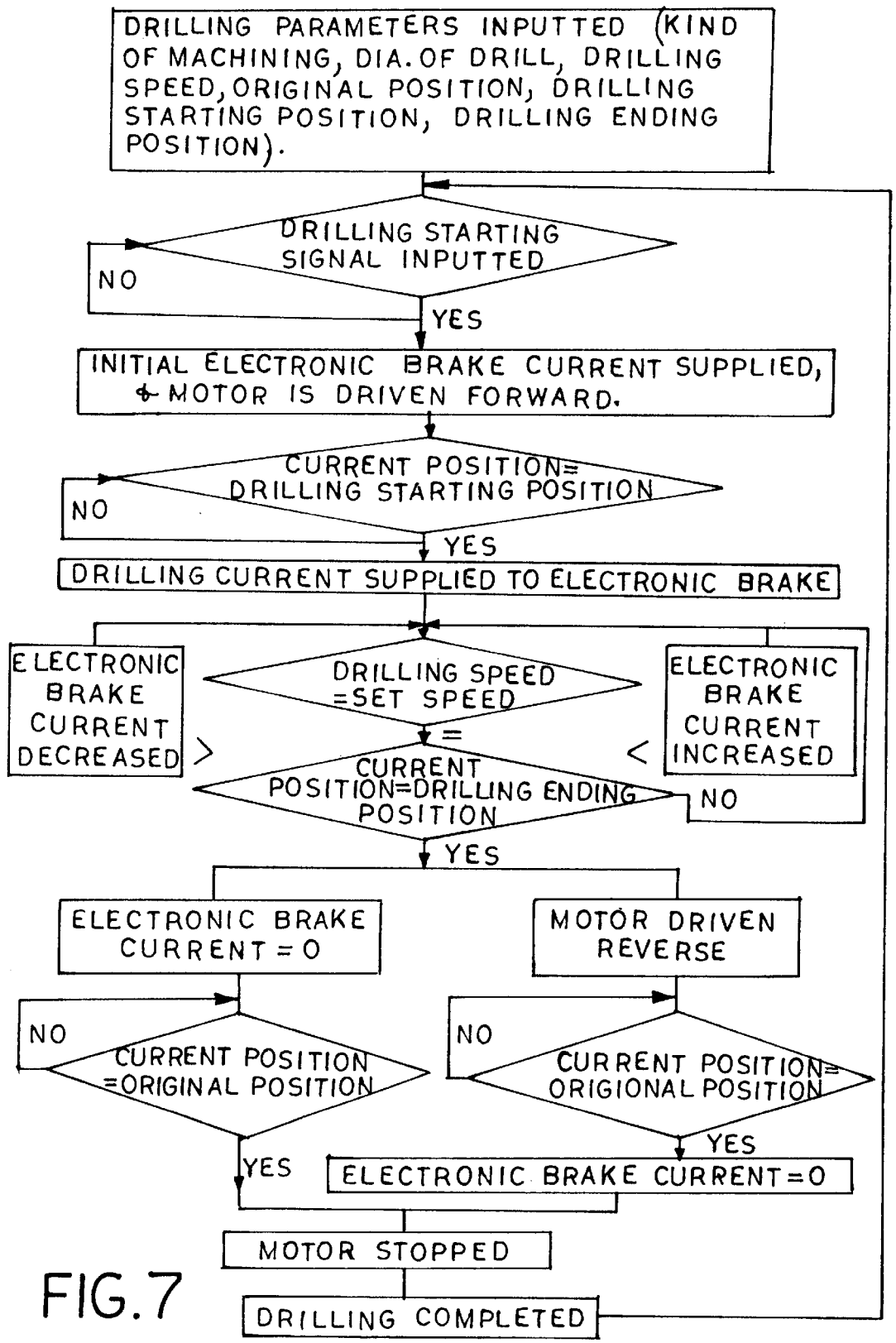
FIG. 7 is a flow chart showing a drilling operation according to the present invention.

Thereafter, the motor 1 is stopped, and the drilling operation is terminated. The above described drilling process is illustrated in FIG. 7.

<Step Feeding Function for the Drilling>

The step feeding can be provided in two methods.

The first method is carried out in such a manner that at every position of certain drilled depths, the drill is made to return to the initial drilling position L1, and then, the drilling is continued to the drilling completion position L2.

The second method is carried out in such a manner that, each time when an abnormal load is imposed on the drill, the drill is made to return to the initial drilling position L1, and then, the drilling is continued to the drilling completion position L2.

The first method will be described in more detail.

Figure 9:
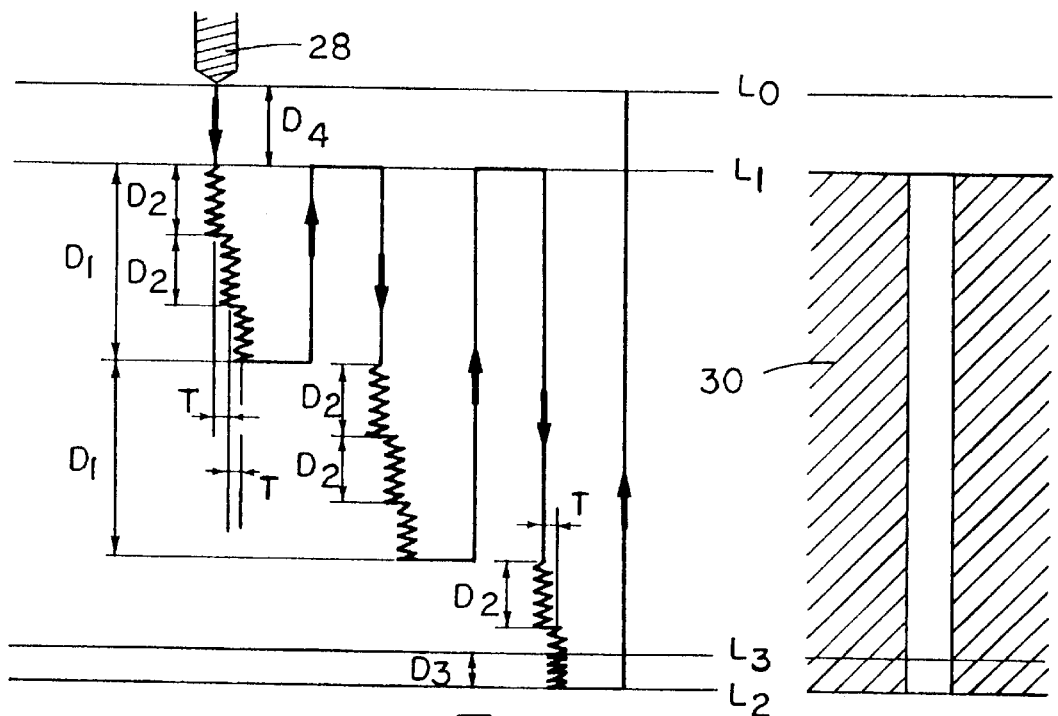
FIG. 9 is a conceptional illustration of the drilling operation according to the present invention.

As shown in FIG. 9, signals of a certain drilled depth D1 are inputted from the spindle sleeve position sensing section E, and the electric current is suppressed to zero. Then the spindle sleeve 13 returns to the initial drilling position L1 owing to the restoring force of the spring 16. At this moment, an electric current needed for drilling operation is supplied again, and this process is repeated until the drill reaches the drilling completion position L2. Upon reaching the drilling completion position L2, the value of the electric current is made to be zero, and the spindle sleeve 13 is made to return to the original position Lo. Then the motor 1 is stopped, thereby completing the drilling.

The second method will be described.

There are two methods of discriminating an abnormal load.

First, as described in connection with the basic mechanical constitution, the driving intermediate pulley 4 and the passive intermediate pulley 5 are known ones. That is, the transmitting torque between the driving and passive intermediate pulleys 4 and 5 is properly adjusted by means of the nut 7 in accordance with the diameter of the drill and the material of the object to be drilled. Under the normal load, the driving intermediate pulley 4 and the passive pulley 3 are driven at a constant speed ratio. However, under an abnormal load, the equilibrium of the speed ratio is destroyed, and a speed difference occurs. This speed difference is sensed, thereby detecting an abnormal load.

Second, during the operation of the motor 1 or during the initial stage of the changing of the revolution direction of the motor 1, the spindle 8 forms an accelerating interval, and enters into a constant speed interval, and then, forms a decelerating interval until it stops. Thus when the load is normal during the constant speed interval, the spindle revolution sensing section C outputs a number of pulses per unit time in a stable manner. However, under an abnormal load, the number of pulses is varied, and this variation makes it possible to discriminate an abnormal load.

If an abnormal load is sensed based on the above described method, the current which is supplied to the electronic brake 21 is suppressed to zero so as to return the spindle sleeve 13 to the drilling starting position L1, and then, a proper value of electric current is supplied to resume the drilling. Through repetition of this procedure, the drilling operation is carried out. The number of the repetitions depends on three factors including: the wear state of the drill, the material of the object to be drilled, and the transmitting torque between the driving and passive intermediate pulleys 4 and 5. If the repetitions are more than the normal value, the alarm is issued.

<Chip Breaking Function for the Drilling>

There are two methods of carrying out the chip breaking function.

First, as shown in FIG. 9, the positions of the spindle sleeve 13 are continuously received from the spindle sleeve sensing section E, so that, at every depth D2, the current of the electronic brake 21 is suppressed to zero for a certain period of time T (e.g., 10–100 ms).

Second, the revolutions of the spindle 8 are continuously received from the spindle revolution sensing section C, so that, at every some revolutions (not shown in the drawing), the current of the electronic brake 21 is suppressed to zero for a certain period of time T (e.g., 10–100 ms). Thus, the chip is not extended to an elongate form, but is broken into short lengths.

<Dual Feeding Function for the Drilling>

Figure 11:
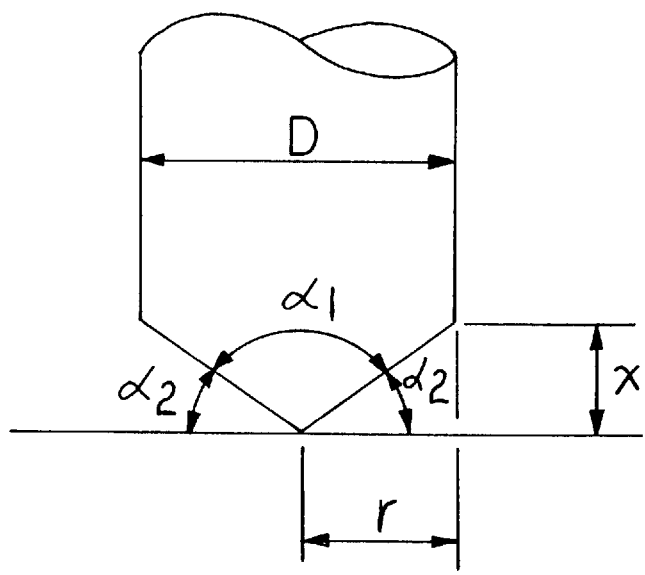
FIG. 11 is a frontal view of a drilling tool showing the angle of the tip portion of the drilling tool according to the present invention.

As shown in FIG. 11, the height X of the inclined portion of the drill 28 is determined proportionally to a diameter D of the drill 28. For example, a drill angle $\alpha 1$ is usually 118°, and the diameter of the drill 28 is D=2r. Hence, $\tan \alpha 2 = \tan 31° = X/r$. Further, the height X=r (radius of the drill)*$\tan \alpha 2 = (D/2) \times 0.6009 \approx 0.3D$.

The diameter D of the drill is inputted during the inputting of the initial processing parameters. Further, a small extra dimension $\alpha$ is added to form X+$\alpha$, and this corresponds to D3 of FIG. 9. At a dual feeding position L3 which corresponds to the drilling terminating position L2 less the depth D3, there is supplied an electric current value which is formed by decreasing the immediately preceding electric current value of the electronic brake as much as a certain ratio, thereby decreasing the drilling advancement speed. Thus the drill 28 passes through drilled hole without encountering a large resistance.

<Dwelling Function for the Drilling>

After drilling down to a certain depth with the drill, the electric current of the electronic brake 21 is adjusted to such a degree that the spindle sleeve 13 would not ascend. Thus a dwelling time of about 2–3 seconds is allowed, and then, the electric current value is suppressed to zero so as to return the spindle sleeve 13 to the original position Lo. This is for improving the roughness and precision of the drilled hole.

<Overload Protecting Function for Drill>

As the sensing method for protecting the drill from an overload, there are three methods.

First, when the spindle 8 stops due to an overload, or when the speed difference between the driving intermediate pulley 4 and the passive pulley 3 is significant, it is detected.

Second, a symptom that an overload is to be imposed on the drill 28 is discovered in advance, thereby preventing the disaster in advance.

Third, an actual state of an overload is sensed. These three methods will be described in detail below.

First, if an overload is imposed on the drill to stop the spindle 8, or if a significant speed difference occurs between the driving intermediate pulley 4 and the passive pulley 3, then the motor 1 is driven reverse, with the electric current of the electronic brake 21 maintained intact. Then the spindle sleeve 13 ascends not only by the restoring force of the spring 16 but also by its own force. Thus when the spindle sleeve 13 returns to the drilling starting position L1, the motor 1 is driven forward, while the electronic brake is made to receive an electric current value smaller than the electric current value immediately before the returning of the spindle sleeve 13. Thus the drilling advancement speed is reduced, and if this state is repeated, an alarm is issued so as to stop the motor 1.

Second, as shown in FIG. 9, the drill is in a nonload state in the interval from the original point Lo to the drilling starting position L1, and therefore, this is a high velocity interval D4. Thereafter, when the drill arrives at the drilling starting position L1, and thus if the load is imposed, the drilling is done in a slow velocity. That is, the advancement velocity per unit time is significantly slowed. Such a significant change is sensed by the spindle revolution sensing section C and the spindle sleeve position sensing section E. Thus the drilling starting position is indirectly computed, and consequently, a deviation (difference) from the initially set drilling starting position L1 can be detected. An example for this will be described below. That is, it is assumed that a plurality of same work pieces are fixed at the same position in a sequential manner to automatically drill them. If the drill is worn out so as for the drill to be subjected to an overload, no matter how firmly the drill is tightened, the drill 28 is pushed back into the drill chuck 27. The pushed-back depth is indicated by β. The high velocity interval D4 for the spindle sleeve 13 is the interval from Lo to L1 during the normal operation, while it is detected to be D4+β during an abnormal state. Thus, the deviation from the initially set drilling starting position L1 can be indirectly detected. Upon detecting such a deviation, an alarm is issued. That is, the wearing of the drill can be detected in advance, so that the drill can be prevented from being imposed with an overload.

Third, as described in the basic operation A of the drilling, if the descending velocity of the spindle sleeve 13 is higher than the initially set drilling advancement velocity, then the electric current of the electronic brake 21 is automatically reduced, while if it is lower, the current is automatically increased. If the current of the electronic brake 21 is larger than the normal value, and if the drilling advancement velocity is significantly slow or is zero, that is, if the advancement velocity per unit time is lower than the normal value, then it means that there has been occurred an abnormality in the drill. The above two cases are detected by the spindle revolution sensing section C and by the spindle sleeve position sensing section E, thereby making it possible to know the worn state of the drill in advance.

<Tapping>

During a drilling, the spindle sleeve 13 returns by the help of the restoring force of the spring 16, while during a tapping, the spindle sleeve 13 is made to move up and down by the help of the braking forces of the electronic brake 21. It becomes efficient if the tension of the spring 16 is adjusted by means of the nut 18 in such a manner that the tension of the spring 16 should be balanced by the sum additions of the weights of the spindle 8, the chuck 27 and the spindle sleeve 13. In the case where a tapping is carried out into a hole of a thick work piece, if the tapping is done at one time continuously, the machining resistance is significantly increased due to the machined chips, with the result that the tap may be broken. In order to prevent this, the step feeding function and the overload protecting function are utilized. The step feeding function refers to carrying out the tapping through a plurality of steps. The overload protecting function refers to detecting an overload state which is caused by the wearing of the tap or by the build-up of the chips, so as to protect the tap. By utilizing these two functions, the micro-controller I drives the motor forward or reverse, or increase or decrease the electric current of the electronic brake 21.

<Basic Operation of Tapping>

The parameters for a tapping such as the kind of tap, the size of pitch, the original position of the spindle sleeve, the tapping starting position, and the tapping ending position are set through manipulating switch section F and the operation and alarming display section H.

If the parameters are inputted, a machining starting signal is inputted. Then, an initial electric current is supplied to the electronic brake 21, and the motor 1 is driven forward.

Then the revolution speed of the spindle 8 and the current position of the spindle sleeve 13 are continuously received through the spindle revolution sensing section C and the spindle sleeve position sensing section E, thereby calculating the current machining speed.

Under this condition, if the current tapping speed is slower than the set value (the pitch of the tap), the electric current is increased. On the other hand, if the current tapping speed is faster than the set value, the current is decreased. Thus, the current of the electronic brake 21 is automatically increased or decreased, in such a manner that the advancing velocity of the spindle sleeve 13 should be same as the initially set value.

Figure 8:
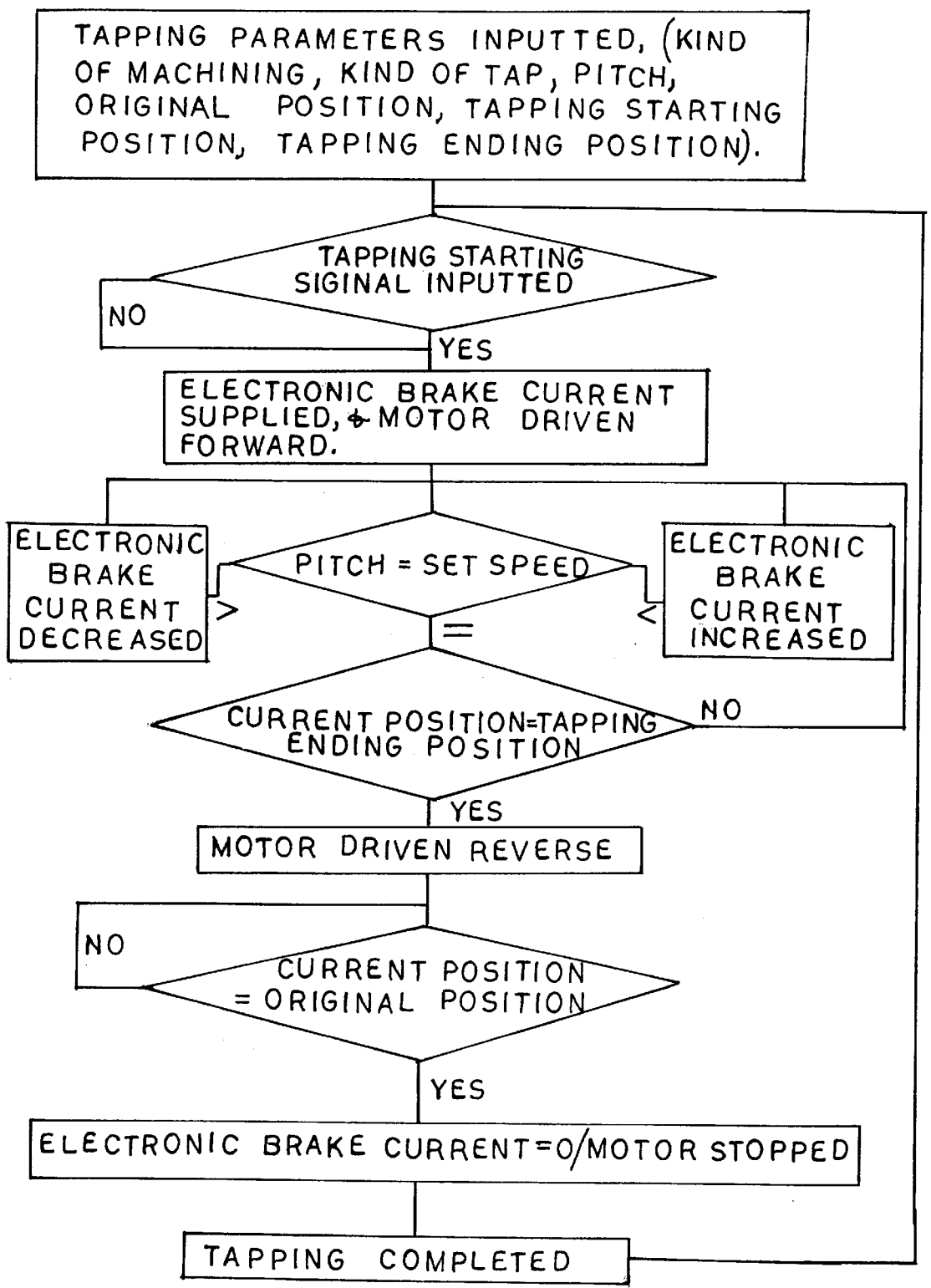
FIG. 8 is a flowchart showing a tapping operation according to the present invention.

In this manner, the tapping is continued, and when the tap reaches the tapping ending position L2, the motor is reversely driven, so that the spindle sleeve 13 would return to the original position Lo. Then the electric current of the electronic brake 21 is made zero, and the motor 1 is stopped. The flow chart showing the above described tapping operation is illustrated in FIG. 8.

<Step Feeding Function of the Tapping>

The step feeding function includes two methods, as in the case of the step feeding function of the drilling.

Figure 10:
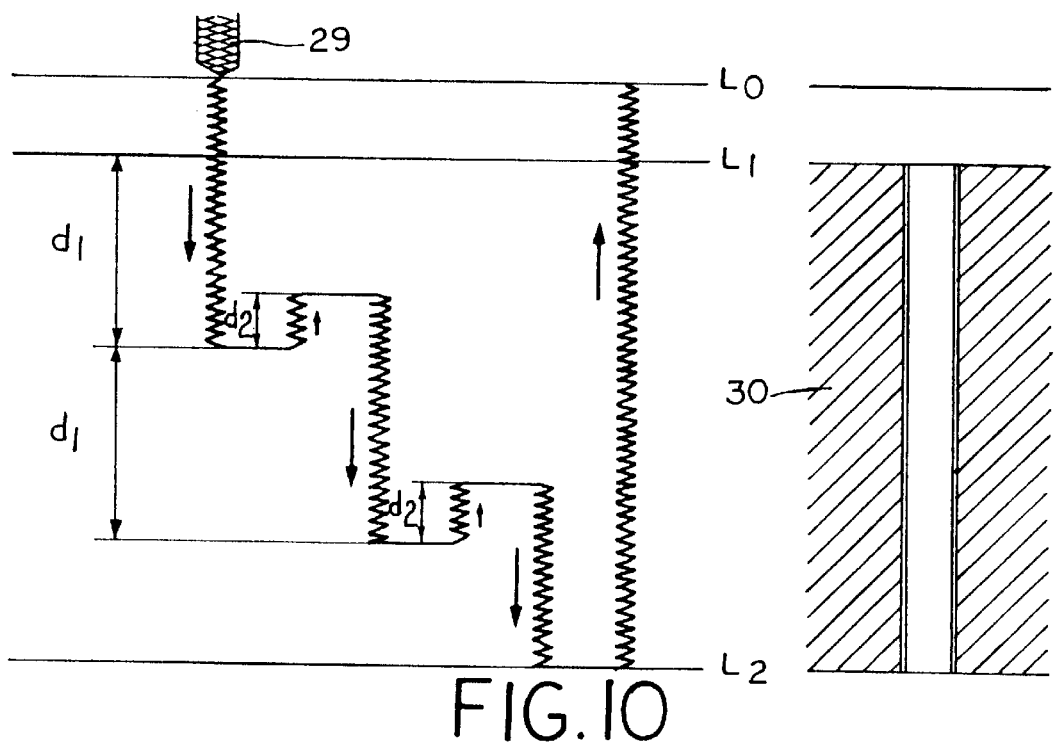
FIG. 10 is a conceptional illustration of the tapping operation according to the present invention.

The first method is carried out in the following manner. That is, as shown in FIG. 10, when the tap arrives from the tapping starting position L1 to a certain depth D1, then the motor 1 is driven reverse. Thus if the spindle sleeve 13 ascends to a certain height d2, the motor 1 is driven forward again, thereby forming threads. This procedure is repeated until the tap reaches a tapping ending position L2, and then, the motor 1 is driven reverse so as to make the spindle sleeve 13 restored to the original position Lo. Then the electric current of the electronic brake 21 is made to be zero so as to stop the motor 1, thereby completing the tapping operation.

The second method is carried out in the following manner. As shown in FIG. 1, the transmitting torque between the driving and passive intermediate pulleys 4 and 5 is properly adjusted by means of the nut 7 in accordance with the kind of tap, thus proceeding the tapping operation. Under the normal load, the driving intermediate pulley 4 and the passive pulley 3 revolve at a constant speed ratio. Under an overload, a deviation (difference) occurs due to an imbalance of the speed ratio. This is detected, and the motor 1 is driven reverse so as to make the spindle sleeve 13 ascend to a certain height d2. Then the motor 1 is driven forward again so as to form threads. This procedure is repeated, until the tapping ending position L2 is reached. Upon reaching the tapping ending position L2, the motor 1 is driven reverse so as to restore the spindle sleeve 13 to the original position Lo. Then the current of the electronic brake 21 is made to be zero, and the motor 1 is stopped, thereby completing the tapping operation.

<Overload Protecting Function for the Tap>

If an overload is imposed on the tap so as to stop the spindle 8, or if the speed difference between the driving intermediate pulley 4 and the passive pulley 3 is significantly increased, then an alarm is issued, and the motor 1 is stopped. This is same as the overload protecting function for the drill in principle.

According to the present invention as described above, the spindle revolution state, the revolution deviation state and the position of the spindle sleeve are detected to input them into the micro-controller. Thus the electric current of the electronic brake is adjusted based on a prepared program, thereby carrying out the drilling and tapping operations. Further, various overload coping devices and an alarming means are provided, thereby diversifying the functions.

What is claimed is:

1. An apparatus for controlling a drilling/tapping machine having an integrated controller, comprising: a spindle; a worm elongately formed on said spindle; a worm wheel meshed with said worm and supported by a lateral shaft; and an electronic brake disposed on a leading end of said lateral shaft, the apparatus further comprising:

a spindle revolution sensing section comprising: a plurality of permanent magnets equidistantly buried into one side face of a passive pulley; and a hall effect switch mating with one of said permanent magnets in a sequential manner;

a revolution difference sensing section comprising: a plurality of permanent magnets equidistantly buried into one side face of a driving intermediate pulley; and a hall effect switch mating with one of said permanent magnets in a sequential manner;

a spindle sleeve position sensing section for sensing vertical movements of a spindle sleeve by making an encoder or a potentiometer perform straight movements or circular movements; and a micro-controller for carrying out arithmetic and overall control functions and memory input/output control functions by receiving sensed data from the above mentioned sections and from a manipulating switch section, and by outputting computed data to an electronic brake control section, a motor forward/reverse driving control section and an operation and alarming display section based on a prepared program.

2. The apparatus as claimed in claim 1, wherein at each of certain depths and under an abnormal load, an electric current value of said electronic switch is adjusted to carry out a step feeding function, and an alarm is issued upon encountering abnormally numerous repetition of said step feeding function.

3. The apparatus as claimed in claim 1, wherein at each of certain depths or at every certain revolutions, the electric current value of said electronic brake is adjusted for a certain period of time to carry out a chip breaking control function.

4. The apparatus as claimed in claim 1, wherein at a dual feeding position, a dual feeding control function is carried out by reducing the electric current value of said electronic brake at a certain ratio.

5. The apparatus as claimed in claim 1, wherein, when the electric current value of said electronic brake is properly adjusted, said spindle sleeve is made to stay in a position, when a drill or tap reaches a pre-set depth, thereby carrying out a dwelling function.

6. The apparatus as claimed in claim 1, wherein: if said spindle stops or if a speed difference between said driving intermediate pulley and said passive pulley is significantly increased, a motor is driven reverse to make a tap or drill return to a drilling or tapping starting position; then said motor is driven forward, and said electronic brake is made to receive an electric current decreased at a certain ratio; and at the same time, said spindle revolution sensing section and said spindle sleeve position sensing section sense a significant variation of a velocity per unit time of said spindle sleeve to continuously detect speed deviations (differences) between said driving intermediate pulley and said passive pulley at the drilling or tapping starting position, whereby an abnormal increase of the electric current of said electronic brake is detected, a significant lowering in a machining advancement is detected, and the abnormal state is alarmed to protect said drill or tap from being subjected to an overload.

* * * * *